June 30, 1925.  
H. O. HEM  
WEIGHING SCALE  
Filed Dec. 29, 1920   5 Sheets-Sheet 1  
1,543,768

Fig. 1.

Inventor  
Halvor O. Hem  
Witness  
C. E. Wilcox  
C. O. Marshall  Attorney

June 30, 1925.   1,543,768
H. O. HEM
WEIGHING SCALE
Filed Dec. 29, 1920   5 Sheets-Sheet 2

June 30, 1925.

H. O. HEM 1,543,768

WEIGHING SCALE

Filed Dec. 29, 1920      5 Sheets-Sheet 5

Inventor
Halvor O. Hem
By C. O. Marshall
Attorney

Witness
C. E. Wilcox

Patented June 30, 1925.

1,543,768

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed December 29, 1920. Serial No. 433,919.

*To all whom it may concern:*

Be it known that I, HALVOR O. HEM, a citizen of the United States, residing at Toledo, in the county of Lucas and State of Ohio, have invented certain new and useful Improvements in Weighing Scales, of which the following is a specification.

This invention relates to weighing scales, particularly of the type commonly known as portable scales, an example of which is shown in the application of Clarence H. Hapgood, Ser. No. 748,874, filed February 17, 1913, which are designed to weigh comparatively heavy commodities and are provided with wheels so that they may be readily moved about.

One of the principal objects of this invention is the provision of improved means for preventing injury to the delicate parts of the scale when the machine is being moved about.

Another object is to provide improved means for preventing accidental shifting of the machine while it is in use.

Another object is to improve the load-offsetting mechanism of the scale.

Still another object is to improve the platform lever mechanism.

Other objects and advantages will be apparent from the following description, in which reference is had to the accompanying drawings illustrating a preferred embodiment of my invention and wherein similar reference numerals designate similar parts throughout the several views.

Referring to the drawings in detail, the base 1 of the scale is supported upon four wheels, 2, the wheels at the forward end of the base being mounted upon an axle 3 which extends through the base, and the rear wheels being fixed upon stub shafts 4 journaled in the sides of the base and in depending brackets 5 within the base.

Secured to lugs 6 and 7 within the front end of the base is a bar 10 which supports the fulcrum bearings of the long platform lever 12. A similar bar 13 is secured to lugs 14 at the rear end of the base and supports the fulcrum bearings of the short platform lever 15.

Resting upon the load pivot 16 of the long lever 12 are load bearings 17 which are pivoted to the lower ends of T-shaped supporting members 18, the crossbars of which carry pins 19 from which are suspended links 20. The T-shaped supporting members 18 are rigidly connected by means of a rod 21 and thereby prevented from tipping sideways. Similar T-shaped supporting members 22 are carried by the short lever 15, the members 22 supporting the links 23 and being connected by a rod 24.

The platform 25 of the scale is provided with depending lugs at its corners, to which are secured bearing members 27 that pass through and rest within the lower ends of the links 20. Owing to the fact that the platform is supported upon each supporting member 18 by parallel links, the members are prevented from tipping fore and aft, and since the rods 21 and 24 prevent their tipping laterally, no relative movement of the pivots and bearings results from swinging movement of the platform, but the platform is nevertheless free to swing in all directions.

Supported upon the rear end of the base is a hollow column 28 upon the upper end of which is supported a substantially watch-casing-shaped housing 29 which contains the automatic load-offsetting mechanism and indicating mechanism of the scale.

The automatic load-offsetting mechanism is of the double pendulum type, and is supported upon a rigid frame 30 having substantially vertical side members 31 with flexible metallic pendulum supporting ribbons 32 secured to their upper ends and overlying their vertical faces. Each pendulum 33 is assembled upon a shaft 34 (see Figs. 7-9) and includes a stem 35 upon which is mounted a weight 36, the stem being threaded so that the weight may be moved therealong by means of nuts 37. If the center of mass of weight is not in the axis of bore, error might result from turning the weight about the stem. The bore through the weight is therefore unthreaded and slightly larger in diameter than the threaded portion of the stem so that the weight may be moved without turning and the stem is provided with a groove 38 (see Figure 7) to be engaged with a screw 39 to prevent the weight from turning.

Figures 2, 7, 8, 9, 10, 11:
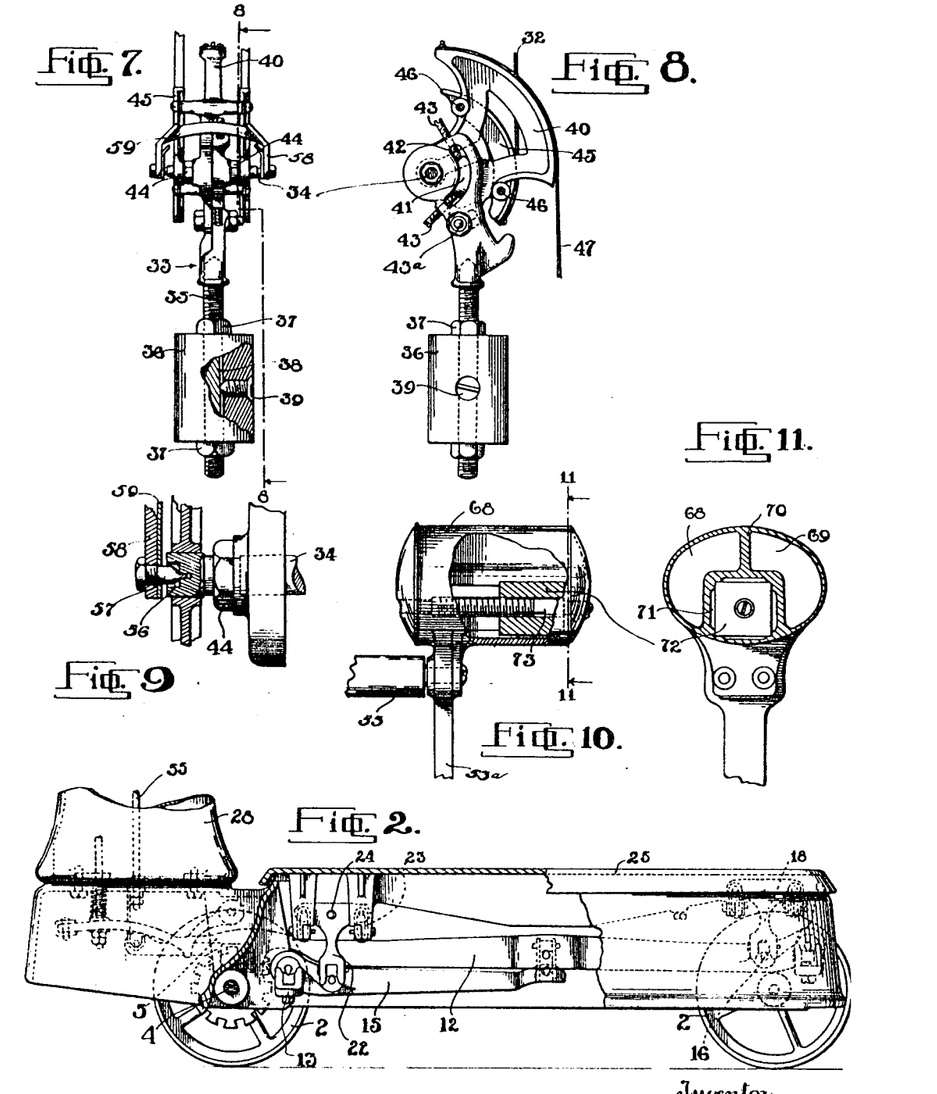
Figure 2 is a side elevation of the base portion of the scale, parts being broken away.
Figure 7 is an enlarged side elevation of one of the pendulums, parts being broken away.
Figure 8 is a section on the line 8—8 of Figure 7.
Figure 9 is a fragmentary detail view showing the connection between one of the pendulums and the compensating bar.
Figure 10 is a detail plan view, with parts broken away, of a sealing device.
Figure 11 is a vertical section therethrough on the line 11—11 of Figure 10.

Revolubly mounted upon the shaft 34 in contact with the weight-carrying member of the pendulum is a power sector 40 having its curved face eccentric to the shaft 34. As is shown in Figure 8, the power sector is provided with a laterally-extending curved lug 41 which is received in an arcuate slot 42 in the stem supporting portion of the pendulum. Adjusting screws 43 are threaded into the supporting member and engage the lug 41 on opposite sides. By loosening one of the screws 43 and turning up the other a very accurate angular adjustment of the power sector relatively to the stem member 35 may be made. A clamping screw 43ª received in a bore in the stem member 35 and an arcuate slot in the power sector may be turned up to retain the members in adjusted position. Mounted upon the shaft 34 adjacent its ends and spaced from the stem and power sector by nuts 44 are two fulcrum sectors 45 which are rigidly clamped to the power sector by means of screws 46 threaded into bosses formed upon the power sector. The curved faces of the fulcrum sectors are preferably concentric to the shaft 34.

The lower ends of the supporting ribbons 32 are secured respectively to the fulcrum sectors 45, the ribbons thus lying between the curved faces of the fulcrum sectors and the vertical guide faces of the member 30.

Secured to and overlying the curved faces of the power sectors 40 is a pair of flexible metallic ribbons 47, the lower ends of which are attached by means of a cross-head 48 to the upper end of a hook link 49. The hook link 49 is connected to a short lever 50 fulcrumed at 51 within the housing 29, and the short lever 50 is in turn connected by means of a tension rod to a beam lever 53 secured upon a bracket 54 secured within the expanded upper end of the column 28. The beam lever 53 is connected by means of a steelyard rod 55 to the nose of the long platform lever 12, and the platform levers are connected together at their centers by means of the link connection shown in Figure 6.

From the foregoing it is evident that when a load is placed upon the platform 25 the steelyard rod 55 is pulled downwardly and the pull is transmitted through the levers 53 and 50 to the ribbons 47, thus drawing the power sectors downwardly and causing the pendulums to swing upwardly and outwardly until the load is offset. As the pendulums swing outwardly, the fulcrum sectors 45 roll upwardly upon the ribbons 32, and the shafts 34, being located at the centers of curvature of the fulcrum sectors, move vertically upwardly.

Figures 12, 13:
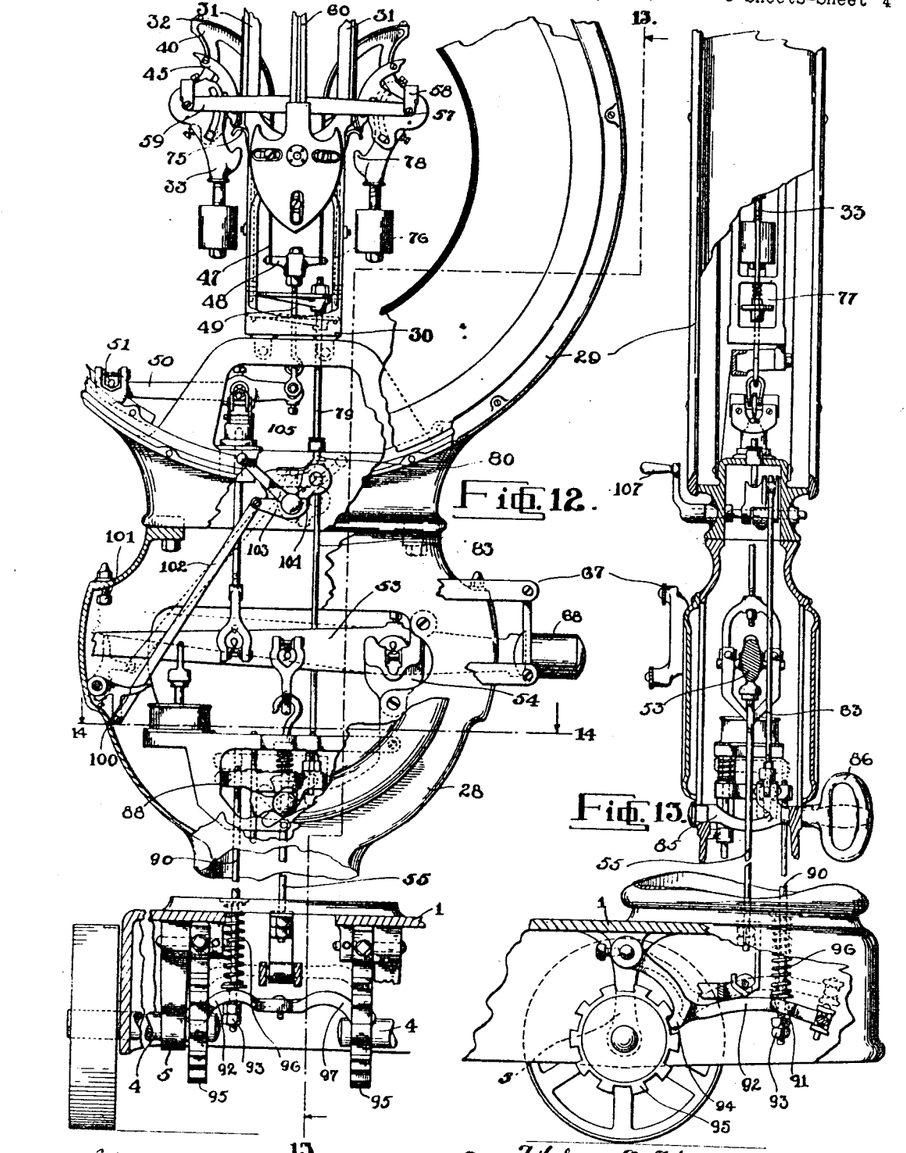
Figure 12 is an enlarged front elevational view, with parts broken away, showing the relation of the weighing and locking mechanisms.
Figure 13 is a sectional view taken substantially on the line 13—13 of Figure 12.
Figure 14:
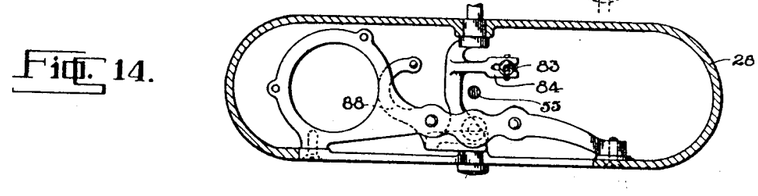
Figure 14 is an enlarged horizontal section taken on the line 14—14 of Figure 12.

In each end of each shaft 34 a recess 56 is bored, shaped as shown in Figure 9 and adapted to receive a conical pin 57. These pins are threaded into yokes 58 (see Figures 9 and 12) and pass through compensating bars 59 into the recess 56. The yokes and compensating bars thus constitute a slightly deformable frame pivotally connected to the shafts 34. The shape of each depression 56 is such that the area of contact between the pin and the shaft is very small, since the conical surface of the pin is in contact only with the annular shoulder between the outer and inner portions of the recess, and if the pin starts moving outwardly, the cylindrical portion of the pin will engage the side of the wider part of the recess, preventing the point of the pin from emerging from the narrower portion and coming into contact with the shoulder between.

The indicator hand 60 is operated by a rack (not shown) pivotally connected to the compensating bars 59 midway between the shafts 34.

Figures 4, 5, 6:
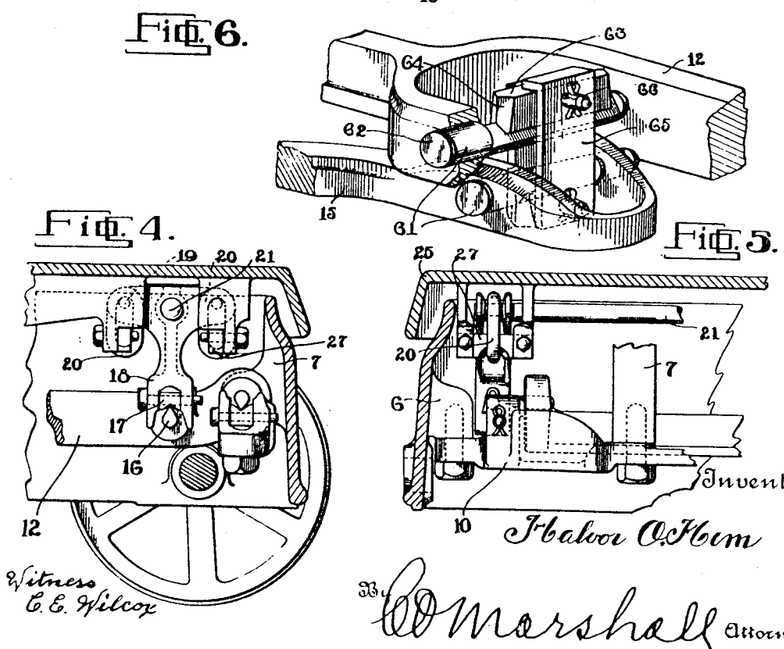
Figure 4 is an enlarged fragmentary detail showing the manner of supporting the levers and the platform.
Figure 5 is a rear elevation of substantially the same parts as are shown in Figure 4.
Figure 6 is a fragmentary perspective view showing the connection between the platform levers.

The novel lever connecting device shown in Figure 6 comprises a pair of pivots each formed from a slightly tapered bar 61 of steel, having portions cut away intermediate its ends so that the remaining portion forms a knife-edge pivot with its edge parallel to the axis of the pin and somewhat inside the original curved surface of the bar. The uncut ends 62 form thrust bearings for the ends of the bearing block 63, which are inclined, as at 64, so as to form substantially a point of contact with the thrust member. The upper and lower bearing blocks 63 are flexibly connected by means of short, flat links 65 and pins 66 which allow the bearing grooves and knife edges of the pivots to automatically come into alignment.

The beam lever 53 extends through opposite sides of the column 28 and carries by supporting arms 53ª a pair of tare beams 67 to be used in the usual way for taring out containers, etc., or for increasing the capacity of the scale. Attached to one end of the beam is a loading box of novel construction (best seen in Figs. 10 and 11). This box contains three cells, the upper cell 68 and the lower cell 69 being divided by a horizontal septum 70 which lies substantially in the plane of the knife edges of the load and fulcrum pivots of the lever to which the loading box is secured. When it is desired to raise the center of mass of the lever to lessen the pendulum action of the lever system as a whole, the upper cell is loaded, and when it is desired to increase the pendulum effect of the lever system, the lower cell is loaded. The third cell or chamber 71 contains a longitudinally movable balancing poise 72 which may be accurately adjusted by turning a screw 73 threaded through the balancing poise and journaled in the ends of the box. The screw 73 is slotted so that it may be turned with a screw driver.

It is desirable in scales of this kind that some means be provided for locking the weighing mechanism and thereby protecting it from injuries which might otherwise result from shocks and jars incident to moving the scale about. In this device I have made it impossible for the scale to be carelessly rolled over the floor with the weighing mechanism unlocked by so connecting the wheel locking mechanism and the pendulum locking mechanism that the wheels are automatically locked when the weighing mechanism is unlocked. I have also provided a device which may be used, when desired, to prevent shocks due to heavy commodities being thrown upon the platform from being transmitted to the pendulum mechanism.

The pendulum lock consists of a pair of hooks 75 (Figs. 12 and 13) each secured to the upper end of a rod 76 which is slidably mounted on the frame 30. Compression coil springs 77 interposed between nuts at the lower ends of the rods and cross members of the frame 30 urge the rods downwardly to pull the hooks into engagement with lugs 78 on the pendulums. It will be observed that the hooks act independently of each other and the firm engagement of each with its pendulum is not affected by wear.

Figures 16, 17, 18, 19:
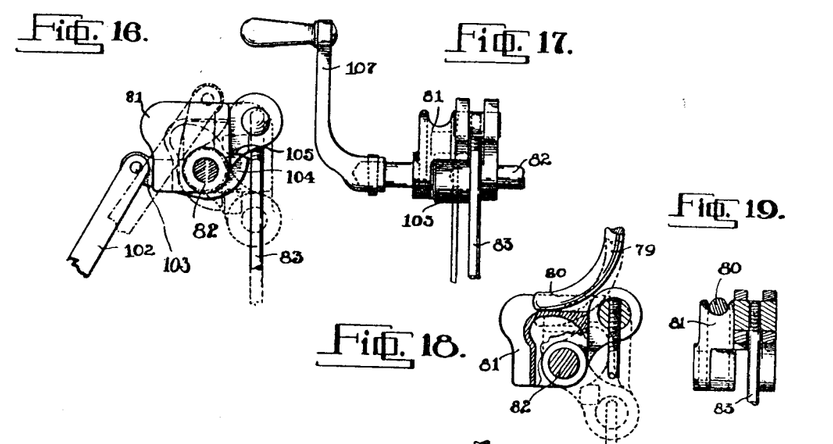
Figures 16 and 17 are respectively a front and side elevation of another part of the locking mechanism.
Figures 18 and 19 are respectively a front and side elevation of a fragment thereof.

For the purpose of holding the hooks out of engagement with the pendulums when the scale is in use, I have provided a vertically-slidable rod 79 having a cross-head at its upper end which, when it is raised, forces the rods 76 upwardly and when it is lowered allows them to descend under the influence of the springs 77. The lower end of the rod 79 has a laterally-directed foot 80 (see Figure 18) which engages a cam member 81 rotatably mounted upon a shaft 82 and having an arm in which is journaled a bearing member having a link 83 secured thereto, the lower end of the link 83 being pivotally attached to an arm 84 projecting from a rockable member 85 which is journaled in the front and rear walls of the column 28. A handle 86 is fixed to the rearward end of the rock member 85 so that it may be turned to draw the link 83 downwardly and thus turn the cam member 81 to lower the rods 79 and 76 and allow the hooks 75 to engage with the lugs 78 on the pendulums.

Secured within the column 28 is a bracket which supports a dash pot to damp the movement of the weighing mechanism, the dash pot plunger being connected to the lever 53. Secured to this bracket is a downwardly-projecting shaft 87 upon which is slidably mounted a lifting member 88 adapted to be raised by a cam 89 upon the rock member 85. A pair of guide rods fixed to the member 88 and slidably mounted in the dash pot supporting bracket serves to hold the member 88 against lateral or turning movement (see Figure 15). Fixed to the lifting member 88 is a downwardly-projecting rod 90, the lower end of which projects loosely through an opening 91 in a curved arm 92 pivoted to the base 1, and is provided with nuts 93 to engage the lower side of the arm and lift it as the rod 90 is raised by the cam 89.

Figure 1:
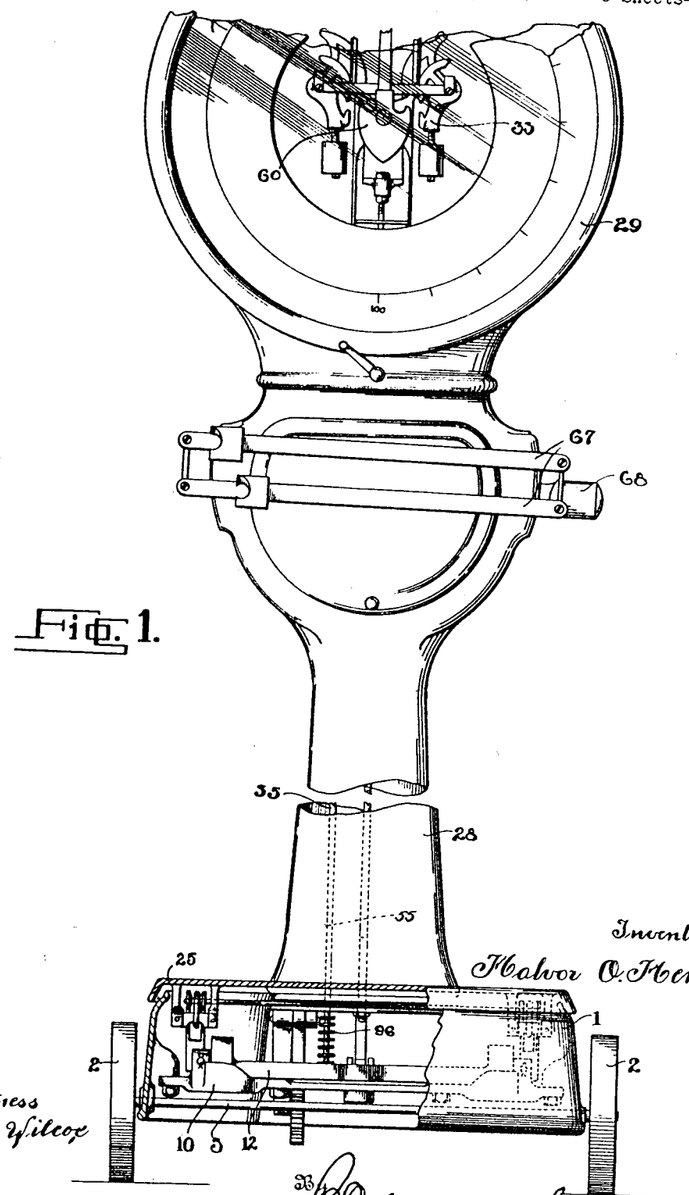
Figure 1 is a front elevation of a scale embodying my invention, parts being broken away and parts shown in section.
Figure 3:
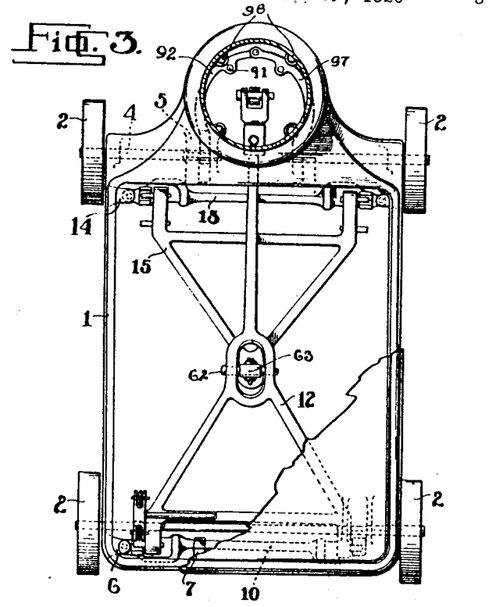
Figure 3 is a plan view of the base, with the column in section and part of the platform broken away to show the lever mechanism.
Figure 15:
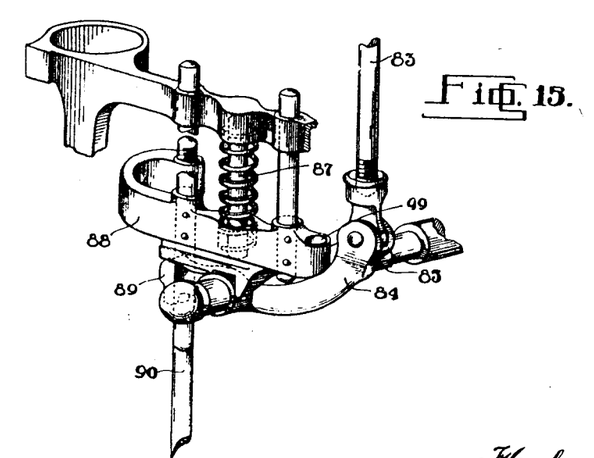
Figure 15 is a further enlarged detail perspective view of substantially the same parts of the locking mechanism.

A detent 94 is fixed upon the lower side of the arm 92 in position to engage a notched wheel 95 secured upon the inner end of one of the stub shafts 4 to which the rear supporting wheels 2 are secured. A stiff helical spring 96 surrounds the rod 90 and is compressed between the arm 92 and the base 1 so that it urges the arm downwardly and when the rod 90 is lowered, forces the detent 94 into one of the notches in the wheel 95. If the detent engages the periphery of the wheel between the notches, it will slip into a notch as soon as the scale is moved slightly. A second curved arm 97 pivoted to the base is connected to the arm 92, by means of a forked end loosely straddling the end of the arm 92, to move therewith and is provided with a similar detent to engage a notched wheel on the stub shaft fixed to the other rear wheel 2. The rear wheels are thus locked simultaneously when the notches of the two notched wheels are in alignment, but either arm may move independently to a sufficient extent to allow it to lock the corresponding wheel even though the other wheel be so turned as to present the portion between notches to the detent. Before the rear wheels can be moved the handle 86 must be turned, thus raising the lifting member 88, rod 90, and arms 92 and 97 to unlock the wheels. When the handle is turned the link 83 is pulled downwardly, turning the cam member 81, thereby allowing the rod 79 with its cross-head and the rods 76 to descend under the influence of the spring 77 until the pendulums are locked by the hooks 75. The steelyard rod 55 extends centrally of the column 28 and is secured to the stirrup at its lower end so that it will operate regardless of which way the column is turned. As will be apparent from an inspection of Figure 3, the lower end of the column 28 is circular and is attached to the base by four equidistantly-spaced bolts 98. As illustrated in Figure 1, the dial faces the platform. If it is desired that the dial face the rear, the upper end of the rod 90 is disconnected from the lifting member 88, the column is faced about, and the upper end of the rod is inserted in the hole 99 in the member 88. If it is desired to face the dial to the left, the lower end of the rod 90 is connected to the arm 97 instead of the arm 92, the upper end being connected as shown in Figure 15. When the dial faces the right the upper end of the rod 90 is inserted in the hole 99 of the member 88, while its lower end is connected to the arm 97.

In order that the pendulums may always be in lower position when the hooks descend, I have provided a device operable by the same means as the pendulum locking mechanism to raise the beam and lock it in elevated position before the pendulum locking hooks descend. When the beam is raised the pendulums, of course, fall to their lowermost position. The beam raising and locking device consists of a finger 100 pivoted within the column 28 just below the beam so that as the finger is swung upwardly it forces the beam upwardly and clamps it against the stop 101. The finger 100 is operated by a link 102 which extends from an arm 103 fixed to the shaft 82 upon which the cam member 81 is rotatably mounted. Integral with the arm 103 is a lug 104 which is engaged by a shoulder 105 on the cam member 81 when the cam member turns to allow the locking hooks to descend. The arm 103 and shaft 82 are thus caused to turn with the cam member 81 and the beam is thereby raised at the beginning of the movement of the cam member 81, the cam being so shaped that the hooks are not allowed to descend until near the end of its turning movement.

It is apparent that when the cam member is holding the rod 79 in elevated position, the shaft 82 with the arm 103 may be turned in a clockwise direction without turning the cam member since when the arm is so operated the lug 104 merely moves away from the shoulder 105. A handle 107 is fixed to the shaft 82 to facilitate this independent operation. The lost motion connection between the arm 103 and the cam member 81 thus makes it possible to lock the beam without unlocking the wheels or locking the pendulums, but the wheels cannot be unlocked without raising and locking the beam lever and also locking the pendulums. It is often desirable to lock the beam while the wheels are locked and the pendulums unlocked, as when heavy articles are to be thrown on the platform or the scale is to be trucked over. Although the beam is locked when the handle 86 is turned to unlock the wheels, the beam is not unlocked when the handle is turned to lock the wheels, as in this operation the shoulder 105 merely moves away from the lug 104 and the mechanism remains under the protection of the beam lock until it is purposely released by turning the handle 107.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a weighing scale, in combination, a frame, supporting wheels therefor, weighing mechanism supported by said frame, said weighing mechanism including pendulum load counterbalancing means and means for alternatively locking said pendulum load counterbalancing means and releasing said wheels or locking said wheels and allowing said pendulum load counterbalancing means to be released.

2. In a weighing scale, in combination, a frame, supporting wheels therefor, weighing mechanism said weighing mechanism including pendulum load counterbalancing means, means for locking certain of said wheels against rotation, means for locking said pendulum load counterbalancing means and an operating device connected to said wheel and pendulum load counterbalancing means locking means for releasing said wheel locking means and causing said pendulum load counterbalancing means locking means to lock said weighing mechanism.

3. In a weighing scale, in combination, a frame, supporting wheels therefor, weighing mechanism supported by said frame said weighing mechanism including pendulum load counterbalancing means, locking means for said pendulum load counterbalancing means, means for locking said wheels against rotation, and common operating means for said wheel lock and said pendulum load counterbalancing means lock, said locking and operating means being operative to lock said pendulum load counterbalancing means when said wheels are released.

4. In a weighing scale, in combination, a frame, supporting wheels therefor, weighing mechanism supported by said frame, locking means for said weighing mechanism, means for locking said wheels against rotation, common operating means for said wheel lock and said weighing mechanism lock, said locking and operating means being operative to lock said weighing mechanism when said wheels are released, and operating means for locking said weighing mechanism lock without releasing said wheel lock.

5. In a weighing scale, in combination, a frame, supporting wheels therefor, automatic weighing mechanism supported by said frame said weighing mechanism including pendulum load counterbalancing means, and means for locking said wheels or alternatively releasing said wheels and locking said pendulum load counterbalancing means.

6. In a weighing scale, in combination, pendulum weighing mechanism, beam weighing mechanism connected to said pendulum weighing mechanism, a lock for each of said weighing mechanisms, common means for operating said locks, and means for separately operating said beam lock.

7. In a weighing scale, in combination, pendulum weighing mechanism, beam weighing mechanism, connected to said pendulum weighing mechanism, a lock for each of said weighing mechanisms, common means to lock said locks, said common means being operative to release said pendulum weighing mechanism lock only and separate means to release said beam lock.

8. In a weighing scale, in combination, weighing mechanism comprising pendulums and a beam connected to said pendulums, means for raising said beam and thereby lowering said pendulums, means for locking said pendulums in lowered position, means for operating said beam raising and pendulum locking means in proper sequence, said operating means being capable, when reversely operated, of unlocking said pendulums, and separate means for releasing said beam raising means.

9. In a weighing scale, a pendulum lock comprising, in combination, a slidably mounted rod, a hook on said rod engageable with the pendulum, a spring urging said rod in a direction to engage said hook with said pendulum, and releasable means contacting said rod for holding said rod against the tension of said spring, said releasable means being movable out of contact with said rod when said hook is engaged with said pendulum.

10. In a weighing scale, in combination, weighing mechanism, a frame supporting said weighing mechanism, supporting wheels for said frame, brake means for said wheels, a spring urging said brake means to breaking position, a cam for moving said brake means against the tension of said spring, a lock for said weighing mechanism, a spring urging said lock to locking position, a cam for moving said lock against the tension of said spring, and means connecting said cams for simultaneous opposite operation.

11. In a weighing scale, in combination, a base, a standard adjustably supported thereon, mechanism having movable members supported respectively by said base and standard, and a connecting member attachable to one of said movable members at a plurality of points to permit change of position of said standard supported member incident to the adjustment of said standard.

12. In a weighing scale, in combination, a base, a rotatably adjustable standard on said base, mechanisms supported respectively by said base and standard, and a connecting member attachable to said mechanisms at a plurality of points to permit change of position of said mechanisms incident to the adjustment of said standard.

13. In a weighing scale, in combination, a base, lever mechanism supported thereby, a rotatably adjustable standard on said base, weighing mechanism supported by said standard, a steelyard rod connecting said lever mechanism and said weighing mechanism, said steelyard rod being located substantially in the center about which said standard is rotatably adjustable, and locking mechanism, including members supported respectively by said base and standard, and a connecting member attachable to said members at a plurality of points to permit relative change of position of said members incident to the adjustment of said standard.

14. In a weighing scale, a pendulum comprising, in combination, a threaded pendulum stem having a longitudinal groove, a weight slidably mounted upon said threaded stem and having a projection engaging said groove and means for locking said weight in adjusted position on said stem.

15. In a weighing scale, a connection comprising, in combination, a member having a recess with a cylindrical wall, said recess having an annular shoulder therein, and a member in said recess, said member having a tapered portion engaged with said shoulder, and a cylindrical portion adapted to engage the cylindrical wall of said recess as said tapered portion moves outwardly on said shoulder.

16. In a weighing scale, in combination, a lever having a pair of aligned load pivots, a pair of rigidly connected supporting members upon said load pivots, parallel links depending from each of said supporting members, and a platform supported by said links.

17. In a weighing scale, in combination, a lever having a pair of aligned load pivots, a pair of rigidly connected T-shaped supporting members upon said load pivots, parallel links depending from the cross-bars of each of said supporting members, and a platform supported by said links.

18. In a weighing scale, in combination, a frame, a pair of supporting wheels therefor, a notched wheel connected to each of said supporting wheels, a pair of arms, each arm having a detent adapted to engage a notch of one of said notched wheels, means for raising one of said arms to disengage its detent from the corresponding notched wheel, and a lost motion connection between said arms whereby said arms may be raised together but neither is prevented from falling to engage its detent with the notch in the wheel by reason of the detent of the other arm resting upon an unnotched portion of its co-operating notched wheel.

19. In a weighing scale, in combination, a frame comprising a base and a standard supported thereon, supporting wheels for said base, means for locking certain of said wheels against rotation, an operating device located upon said standard, and an operative connection between said operating device and said locking means.

20. In a weighing scale, in combination, a frame, supporting wheels therefor, weighing mechanism supported on said frame, said weighing mechanism comprising pendulums and a beam connected to said pendulums, means for raising said beam and thereby lowering said pendulums, means for locking said pendulums in lowered position, means for operating said beam raising and pendulum locking means in proper sequence, said operating means being capable when reversely operated of unlocking said pendulums, means for locking said frame against movement upon said supporting wheels, and means connecting said frame locking means to said operating means whereby when said operating means is operated to unlock said pendulums said frame is caused to be locked against movement.

HALVOR O. HEM.

Witnesses:
FRANCES DOYLE,
MILDRED ANGELL.